US008898052B2

(12) United States Patent
Waibel et al.

(10) Patent No.: US 8,898,052 B2
(45) Date of Patent: Nov. 25, 2014

(54) SYSTEMS AND METHODS FOR TRAINING STATISTICAL SPEECH TRANSLATION SYSTEMS FROM SPEECH UTILIZING A UNIVERSAL SPEECH RECOGNIZER

(75) Inventors: Alex Waibel, Pittsburgh, PA (US); Matthias Paulik, Philippsburg (DE)

(73) Assignee: Facebook, Inc., Menlo Park, CA (US)

( * ) Notice: Subject to any disclaimer, the term of this patent is extended or adjusted under 35 U.S.C. 154(b) by 1549 days.

(21) Appl. No.: 11/751,909

(22) Filed: May 22, 2007

(65) Prior Publication Data

US 2007/0271088 A1   Nov. 22, 2007

Related U.S. Application Data

(60) Provisional application No. 60/802,873, filed on May 22, 2006.

(51) Int. Cl.
*G06F 17/27* (2006.01)
*G06F 17/28* (2006.01)
*G10L 15/00* (2013.01)

(52) U.S. Cl.
CPC .......... *G06F 17/275* (2013.01); *G06F 17/2785* (2013.01); *G06F 17/2818* (2013.01); *G10L 15/005* (2013.01)
USPC .................................................. 704/9; 704/2

(58) Field of Classification Search
CPC ........................... G06F 17/2785; G06F 17/289
USPC .................................... 704/2, 9, 256
See application file for complete search history.

(56) References Cited

U.S. PATENT DOCUMENTS

| 6,085,160 | A | * | 7/2000 | D'hoore et al. | 704/256.2 |
| 7,552,053 | B2 | * | 6/2009 | Gao et al. | 704/258 |
| 7,643,985 | B2 | * | 1/2010 | Horvitz | 704/2 |
| 2005/0143995 | A1 | * | 6/2005 | Kibkalo et al. | 704/242 |
| 2005/0149319 | A1 | * | 7/2005 | Honda et al. | 704/9 |
| 2007/0016401 | A1 | * | 1/2007 | Ehsani et al. | 704/9 |

OTHER PUBLICATIONS

Satoshi Nakamura (The ATR Multilingual Speech-to-Speech Translation System), IEEE Transactions, vol. 14, No. 2., Mar. 2006.*

(Continued)

*Primary Examiner* — Farzad Kazeminezhad
(74) *Attorney, Agent, or Firm* — Fenwick & West LLP

(57) ABSTRACT

An iterative language translation system. The system includes a first automatic speech recognition component adapted to recognize spoken language in a source language and to create a source language hypothesis and a first machine translation component adapted to translate the source language hypothesis into a target language. The system also includes a second universal automatic speech recognition component adapted to recognize spoken languages in plurality of target languages spoken by a translator, and wherein the second automatic speech recognition component is further adapted to create a target language hypothesis. The system further includes a second machine translation component adapted to translate the target language hypothesis into the source language, wherein the translation of the target language hypothesis into the source language is used to adapt the first automatic speech recognition component, wherein the translation of the source language hypothesis into the target language is used to adapt the second automatic speech recognition component, wherein the source language hypothesis is used to adapt the first machine translation component and the second machine translation component, and wherein the target language hypothesis is used to adapt the first machine translation component and the second machine translation component.

18 Claims, 8 Drawing Sheets

(56) References Cited

OTHER PUBLICATIONS

Kikui, G. et al., "Creating Corpora for Speech-to-Speech Translation," *Proceedings of Eurospeech 2003*, Sep. 1-4, 2013, pp. 381-384, Geneva, Switzerland.

Schultz, T. et al., "Language-independent and language-adaptive acoustic modeling for speech recognition," *Speech Communication*, Feb. 2001, pp. 31-51, vol. 35.

Soltau, H. et al., "A One-Pass Decoder Based on Polymorphic Linguistic Context Assignment," *Proceedings of Automatic Speech Recognition and Understanding* (*ASRU* 2001), Dec. 9-13, 2001, pp. 214-217, Madonna di Campiglio, Italy.

Vogel, S. et al., "The ISL Statistical Translation System for Spoken Language Translation," *Proceedings of IWSLT*, 2004, Kyoto, Japan, eight pages.

\* cited by examiner

|  | WER | OOV | Perplexity |
|---|---|---|---|
| English Baseline ASR | 20.4 | 0.53% | 86.0 |
| Spanish Baseline ASR | 17.2 | 2.04% | 130.2 |

|  | WER | OOV | Perplexity |
|---|---|---|---|
| English Baseline ASR | 13.5 | 0.56% | 21.9 |
| Spanish Baseline ASR | 15.1 | 3.20% | 75.5 |
| Mandarin Baseline ASR | 20.0 | 1.14% | 70.1 |

FIG. 8 ical Speech Translation Systems from Speech Utilizing a
Universal Speech Recognizer

SYSTEMS AND METHODS FOR TRAINING STATISTICAL SPEECH TRANSLATION SYSTEMS FROM SPEECH UTILIZING A UNIVERSAL SPEECH RECOGNIZER

CROSS REFERENCE TO RELATED APPLICATION

The present application claims priority to U.S. Provisional Patent Application No. 60/802,873 filed May 22, 2006.

BACKGROUND

Speech translation systems combine recognition of speech with translation from one language ("source language") to another language ("target language") followed by optional synthesis or text output in a target language. The development of such systems requires development of high performance speech recognition systems and translation systems. For their development, these systems require substantial data resources based on how the recognition and translation engines are trained or developed. Thousands of spoken sentences have to be transcribed, and thousands of sentences in one language have to be translated into another. Moreover, data collection has to be redone with each new language and, when necessary, for different domains and genres.

Thus, there is a need for methods and apparatuses that allow speech translation systems to be trained or to "learn" from examples provided by human simultaneous translators. There is a further need for methods and apparatuses in which speech data in both source and target languages are presented and which speech and translation engines iteratively learn together, thereby foregoing the labor intensive and costly steps of annotating data from speech and translating texts and of training and optimizing the speech recognition and translation engines independently first before system combination is attempted. Also, there is a need for a field-correctable translation system in which a person in the field of use can correct errors made by the system so that the system will adapt. There is a further need for a translation system that is adept at translating languages for which there is not a large written corpus.

SUMMARY

In various embodiments, the present invention is directed to an iterative language translation system. The system includes a first automatic speech recognition component adapted to recognize spoken language in a source language and to create a source language hypothesis and a first machine translation component adapted to translate the source language hypothesis into a target language. The system also includes a second automatic speech recognition component adapted to recognize spoken language in the target language that is spoken by a translator, and wherein the second automatic speech recognition component is further adapted to create a target language hypothesis. The system further includes a second machine translation component adapted to translate the target language hypothesis into the source language, wherein the translation of the target language hypothesis into the source language is used to adapt the first automatic speech recognition component, wherein the translation of the source language hypothesis into the target language is used to adapt the second automatic speech recognition component, wherein the source language hypothesis is used to adapt the first machine translation component and the second machine translation component, and wherein the target language hypothesis is used to adapt the first machine translation component and the second machine translation component.

In various embodiments, the present invention is directed to an iterative method of translating language from a source language to a target language. The method includes recognizing, with a first automatic speech recognition component, spoken language in a source language and to create a source language hypothesis and translating, with a first machine translation component, the source language hypothesis into a target language. The method also includes recognizing, with a second automatic speech recognition component, spoken language in the target language that is spoken by a translator and creating, with the second automatic speech recognition component, a target language hypothesis. The method further includes translating, with a second machine translation component, the target language hypothesis into the source language, adapting the first automatic speech recognition component using the translation of the target language hypothesis into the source language, and adapting the second automatic speech recognition component using the translation of the source language hypothesis into the target language. The method also includes adapting the first machine translation component and the second machine translation component using the source language hypothesis and adapting the first machine translation component and the second machine translation component using the target language hypothesis.

In various embodiments, the present invention is directed to an iterative language translation system. The system includes an automatic speech recognition component adapted to recognize spoken language in a source language and to create a source language hypothesis and a machine translation component adapted to translate the source language hypothesis into a target language. The system also includes a universal speech recognition component adapted to recognize spoken language in any language, and wherein the universal speech recognition component is further adapted to create a representation of target language speech, wherein the translation of the target language hypothesis into the source language is used to train the automatic speech recognition component, wherein the translation of the source language hypothesis into the target language is used to train the universal speech recognition component, wherein the source language hypothesis is used to train the machine translation component, and wherein the representation of target language speech is used to train the machine translation component.

In various embodiments, the present invention is directed to an iterative language translation system. The system includes an automatic speech recognition component adapted to recognize spoken language in a source language and to create a source language hypothesis and a machine translation component adapted to translate the source language hypothesis into a target language. The system also includes a universal speech recognition component adapted to recognize spoken language in any language, and wherein the universal speech recognition component is further adapted to enhance a target language hypothesis that has been created from a monolingual extract of text material in the target language, wherein the translation of the target language hypothesis into the source language is used to train the automatic speech recognition component, wherein the translation of the source language hypothesis into the target language is used to train the universal speech recognition component, wherein the source language hypothesis is used to train the machine translation component, and wherein the target language hypothesis is used to train the machine translation component.

In various embodiments, the present invention is directed to an iterative language translation system for translating a source language to a target language. The system includes first recognition means for recognizing spoken language in a source language and for creating a source language hypothesis, first translation means for translating the source language hypothesis into a target language, and second recognition means for recognizing spoken language in the target language that is spoken by a translator. The system also includes means for creating a target language hypothesis, second translation means for translating the target language hypothesis into the source language, and means for adapting the first recognition means using the translation of the target language hypothesis into the source language. The system further includes means for adapting the second recognition means using the translation of the source language hypothesis into the target language, means for adapting the first translation means and the second translation means using the source language hypothesis, and means for adapting the first translation means and the second translation means using the target language hypothesis.

In various embodiments, the present invention is directed to a computer readable medium having stored thereon instructions which, when executed by a processor, cause the processor to:

recognize, with a first automatic speech recognition component, spoken language in a source language and to create a source language hypothesis;

translate, with a first machine translation component, the source language hypothesis into a target language;

recognize, with a second automatic speech recognition component, spoken language in the target language that is spoken by a translator;

create, with the second automatic speech recognition component, a target language hypothesis;

translate, with a second machine translation component, the target language hypothesis into the source language;

adapt the first automatic speech recognition component using the translation of the target language hypothesis into the source language;

adapt the second automatic speech recognition component using the translation of the source language hypothesis into the target language;

adapt the first machine translation component and the second machine translation component using the source language hypothesis; and adapt the first machine translation component and the second machine translation component using the target language hypothesis.

Those and other details, objects, and advantages of the present invention will become better understood or apparent from the following description and drawings showing embodiments thereof.

BRIEF DESCRIPTION OF THE DRAWINGS

The accompanying drawings illustrate examples of embodiments of the invention. In such drawings:

FIG. 8 illustrates an overview of the performance of baseline ASR systems; and

DESCRIPTION

Figure 1:
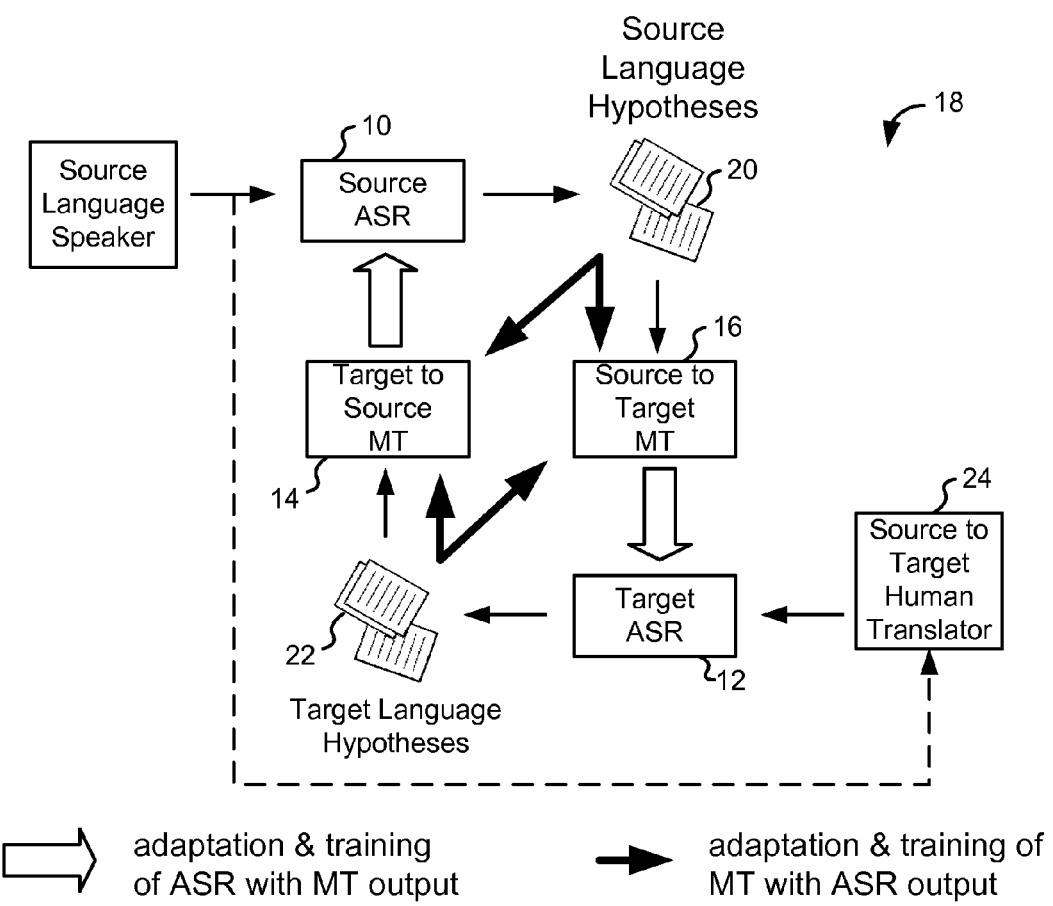
FIG. 1 illustrates an embodiment of an iterative speech translation system.

Various embodiments of the present invention describe methods and apparatuses that permit automatic training of speech translation systems from field input and from examples gathered from human simultaneous translators. In various embodiments, translation systems may be trained based on a parallel corpus of spoken speech in, for example, two languages (e.g., recorded speech from a speaker and from an interpreter who interprets the speech). Various embodiments reduce development time, because it is not necessary to collect and transcribe speech data and translation data. Various embodiments of a method for adapting and training statistical speech translation systems directly and in an unsupervised manner from the speech of human translators, including in particular the training of machine translation systems from speech are described.

Various embodiments of the present invention are directed to an unsupervised training scheme for statistical speech translation. As used herein, the term "speech translation system" refers to any system or software that provides translation of speech in one source language to text in another target language. As used herein, the term "training data" includes, for example, monolingual text data for language model training, sentence aligned bilingual text data for translation model training, or audio data along with the transcripts for acoustic model training. Automatic speech translation consists of two steps: automatic speech recognition for transcribing the speech in the source language and automatic translation for translating the transcribed source language speech into the target language. According to these two steps, speech translation systems traditionally consist of two separate system components—the speech recognition system and the machine translation system. Automatic speech recognition (ASR) systems and machine translation (MT) systems rely on learning (e.g., statistical learning) models for recognizing speech or translating text. The statistical models include the acoustic model for speech recognition and the translation model for machine translation. In addition, both systems (e.g., in the case of large vocabularies) rely on statistical n-gram language models. To estimate good statistical models, large corpora of training data are needed. These corpora consist of transcribed speech data (e.g., audio files of speech together with their transcriptions in text form) for estimating the acoustic model and of aligned bilingual text data for estimating the translation model.

As used herein, the term "supervised training" means that the corresponding statistical models are trained under human supervision as the training corpora are created by human transcribers or human translators. For the estimation of acoustic models unsupervised training methods are also often used in which an already existing speech recognition system is used to automatically transcribe speech data. The transcribed speech data are then used to further refine the acoustic model. Similarly, adaptation of speech recognizers have been accomplished and improved using automatically translated bilingual data.

Various embodiments of the present invention are directed to a training and adaptation scheme that permits direct training and/or adaptation of complete statistical speech translation systems from speech in an unsupervised manner. As used herein, the term "complete" refers to the situation in which all involved statistical models are jointly refined. This includes, for example, an unsupervised training of statistical translation models from the speech of human translators. Various embodiments of the methods described herein are iterative and rely on the availability of the target language speech of one or more human translators and on the availability of the source language speech or a source language text document that is being translated by the human translator(s). An example training scenario used by embodiments of the present invention would be the simultaneous translation of a speech within the United Nations or the European Parliament, where the speech of the simultaneous translator and the speech of the lecturer can be recorded.

In the training scheme, two different training situations can be distinguished in various embodiments—one of them document driven (see FIG. 3) and the other one speech driven (see FIG. 1). In the document driven case a human translator speaks the translation of a text document. In the speech driven case a human translator speaks the translation of source language speech during, for example, a simultaneous translation.

As illustrated in FIG. 1, according to various embodiments the training scheme relies in the speech driven case on two (or more) statistical speech translation systems, each consisting of an automatic speech recognition (ASR) component 10, 12 and a machine translation (MT) component 14, 16. Both speech translation systems are connected in an iterative, overall system 18 to allow a recursive adaptation and training of all involved system components. In the system 18, all available knowledge sources, namely the speech in the source and target language, can be incorporated and used for adaptation and training of the different system components (i.e., for adaptation and training of their attached statistical models).

The adaptation and training of the system components of the system 18 works as follows in various embodiments: starting with source language speech recognition hypotheses 20 and their automatically created target language translations, it is possible to bias the target language speech recognition system 12 towards the gained knowledge, e.g. by adapting the ASR language model. Because the target language machine translation hypotheses 22 can be seen as a prediction of what a human translator 24 will say, the recognition accuracy of the biased target ASR system 12 will improve. As a result, the target language ASR hypotheses 22 will be of a higher quality (less erroneous).

The high quality target language ASR hypotheses 22 can then be used in two different ways: as additional training data for the target language ASR system 12 (for a further training or adaptation of the acoustic models and the ASR language model) and as additional training data for the source to target MT 16 and the target to source MT 14. The usage as additional training data for both machine translation systems 14, 16 is possible because the hypotheses 20, 22 together form an aligned bilingual corpus, suitable for training the respective translation models. Also, the hypotheses 20, 22 can be used as additional training or adaptation data for the respective target language models used within the two machine translation systems 14, 16.

In various embodiments, it is possible to improve the performance of the target ASR system 12 with the automatically translated source hypotheses 20 and it is again possible to improve the performance of the source ASR system 10 by automatically translating the target ASR hypotheses 22. Thus, the system 18 performs in an iterative manner and the iterative cycle can be traversed x times on the same data. In various embodiments, the value of x can be estimated in two ways, depending on the ultimate goal for applying the iterative scheme. First, the iterative cycle can be traversed until a saturation in the improvement/a decrease in performance of the different statistical models on a control set is observed. As used herein, the term "control set" refers to a small data set with known transcripts on which the same iterative training scheme is applied. The stopping criterion is applied in order to maximally adapt the involved systems towards the given data so that a maximal quality for the ASR hypotheses 20, 22 can be accomplished. The second possible stopping criterion is to traverse the iterative cycle until the performance on a held out data set starts to decrease, thereby indicating an overfitting of the statistical models towards the used training data. As used herein, the term "held out data" refers to a data set of the same or similar domain as the training data, whereas the iterative training scheme is not being applied to this data. The second stopping criterion is applied to train the respective statistical models (ASR models and MT models) so that the training data is utilized in an optimal way.

In various embodiments, the iterative nature of the system 18 allows for the incorporation of knowledge provided by not just one audio stream in another language, but by many. An example is the simultaneous translation of a European Parliament speech into multiple languages by a multitude of human translators. Also, while embodiments of the present invention automatically provide an improvement (in the sense of an adaptation or an additional training) of all involved systems components, in various embodiments the adaptation/training may be steered towards a more optimal utilization of the available data for one (or a specific subset) of the involved system components.

Various embodiments of the present invention may be used for training and/or adaptation of speech translation systems or "focused" training and/or adaptation of one of the system components of a speech translation system (either ASR or MT). Various embodiments may be used for adaptation and training of speech recognition systems for human translators and ASR systems as a tool for human translators to speed up translations with the intended use of the translations in text form for publication or archiving. Various embodiments may be used for rapid adaptation of existing speech translation systems to new domains and rapid development of speech translation systems for resource deficient languages ("learning by doing"). Also, various embodiments may be used for correcting mistakes in existing speech translation systems, and effective adapting and improving system performance during use.

An implementation of the system 18 was constructed with Spanish as the source language and English as the target language. The data set used+ consisted of 500 parallel English and Spanish sentences in form and content close to the Basic Travel Expression Corpus (BTEC) described in G. Kikui, E. Sumita, T. Takezawa, and S. Yamamoto, "Creating Corpora for Speech-to-Speech Translation," Proceedings of Eurospeech, Geneva, Switzerland, 2003. The sentences were presented two times, each time read by three different Spanish and five different English speakers. Ten percent of the data was randomly selected as heldout data for system parameter tuning. Parameter tuning was done by mammal gradient descent throughout this work. Because of some flawed recordings, the English data set had 880 sentences with 6,751 (946 different) words. The respective Spanish data set had 900 sentences composed of 6,395 (1,089 different) words. The Spanish audio data equaled 45 minutes and the English 33 minutes.

Because the sentences were presented two times there were always two ASR hypotheses for each sentence, decoded on the speech of two different speakers. Using both of these hypotheses within the iterative system 18 would change the system 18 into a voting system that chooses between the two hypotheses. Thus, the data set was split into two disjoint parts, so that each Spanish-English sentence pair occurred only once within each subset. Based on the two subsets, two different iterative systems had to be examined. In the following discussion, only the average performance, calculated on the two individual system results, is given.

Figures 2, 3:
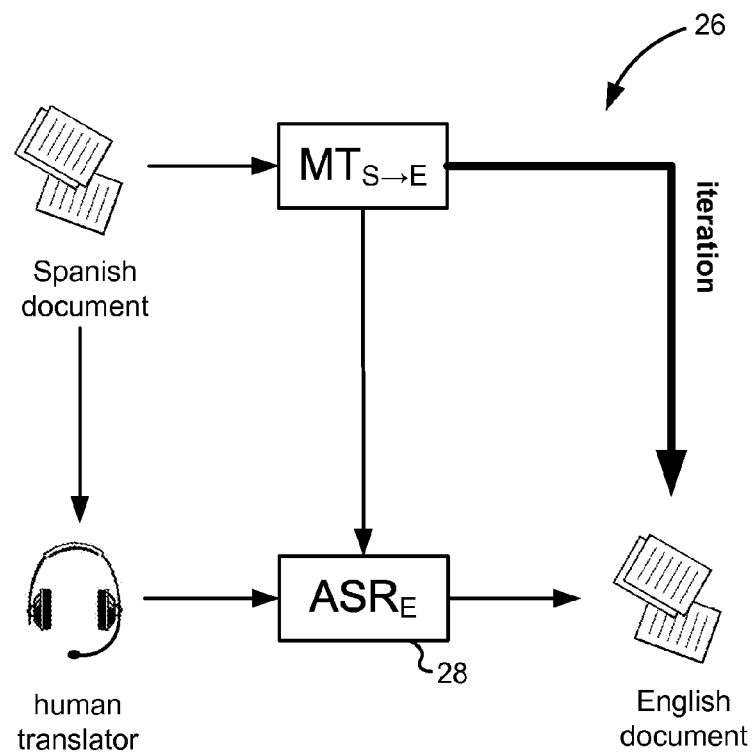
FIG. 2 illustrates an overview of the performance characteristics of an English and Spanish baseline ASR system.
FIG. 3 illustrates an embodiment of a document driven system.

For the example embodiment of the system 18, a Janus Recognition Toolkit (JRTk) featuring the IBIS single pass decoder, as described in H. Soltau, F. Metze, C. Fugen, and A. Waibel, "A One-Pass Decoder Based on Polymorphic Linguistic Context Assignment," Proceedings of ASRIJ, Madonna di Campiglio, Italy, 2001, was used. FIG. 2 illustrates an overview of the performance characteristics of the English and Spanish baseline ASR system.

In the example implementation, the English speech recognition system 12 was a subphonetically tied semi-continuous three-state HMM based system that had 6K codebooks, 24K distributions and a 42-dimensional feature space on MFCCs after LDA. It used semi-tied covariance matrices, utterance-based CMS and incremental VTLN with feature-space constrained MLLR. The vocabulary size was 18K. The recognizer was trained on 180 h Broadcast News data and 96 h Meeting data. The back off tri-gram language model was trained on the English BTEC which consisted of 162.2K sentences with 963.5K running words from 13.7K distinct words.

Spanish recognizer 10 had 2K codebooks and 8K distributions; all other main characteristics were equivalent to the characteristics of the English recognizer. The vocabulary size was 17K. The system was trained on 112 h South American speech data (mainly Mexican and Costa Rican dialects) and 14 h Castilian speech data. The South American corpus was composed of 70 h Broadcast News data, 30 h Globalphone data and 12 h Spanish Spontaneous Scheduling Task data. The back-off tri-gram LM was trained on the Spanish part of the BTEC.

In the example implementation, the ISL statistical machine translation system described in S. Vogel, S. Hewavitharana, M. Kolss, and A. Waibel, "The ISL Statistical Machine Translation System for Spoken Language Translation," Proceedings of IWSLT, Kyoto, Japan, 2004, was used for creating the English-to-Spanish 14 and Spanish-to-English translations 16. The MT system was based on phrase-to-phrase translations (calculated on word-to-word translation probabilities) extracted from a bilingual corpus, i.e., the Spanish/English BTEC. The MT system produces an n-best list of translation hypotheses for a given source sentence with the help of its translation model (TM), target language model and translation memory. The translation memory works as follows: for each source sentence that has to be translated the closest matching source sentence, with regard to the edit distance, is searched in the training corpus and extracted along with its translation. In case of an exact match the extracted translation was used, otherwise different repair strategies were applied to find the correct translation. The translation model computed the phrase translation probability based on word translation probabilities found in its statistical IBM1 forward and backward lexica regardless of the word order. The word order of the MT hypotheses was therefore appointed by the LM and translation memory. Because the MT and the ASR used the same language models, only the translation memory can provide additional word order information for improving the ASR.

Various embodiments of the present invention employ ASR improvement techniques. In one embodiment, for hypothesis selection the 150 best ASR hypotheses of the ASR system are used together with the first best MT hypothesis of the MT system preceding this ASR system within the iterative cycle. The applied rescoring algorithm computes new scores (negative log-probabilities) for each of the 151 sentences by summing over the weighted and normalized ASR score ($s_{ASR}$), language model score ($s_{LM}$), and translation model score ($s_{TM}$) of the sentence. To compensate for the different ranges of the values for the TM, LM and ASR scores, the individual scores in the n-best lists are scaled to [0; 1].

$$s_{final} = s'_{ASR} + w_{LM} * s_{LM} + w_{TM} * s_{TM} \quad (1)$$

The ASR score output by the JRTk is a linear combination of acoustic score, scaled language model score, word penalty lp and filler word penalty fp. The language model score within this linear combination contains discounts for special words or word classes. The rescoring algorithm allows to directly change the word penalty and the filler word penalty added to the acoustic score. Moreover, four new word context classes with their specific LM discounts may be used: MT mono-, bi-, trigrams and complete MT sentences (the respective LM discounts are md, bd, td and sd). MT n-grams are n-grams included in the respective MT nbest list; MT sentences are defined in the same manner. The ASR score in equation (1) is therefore computed as:

$$s'_{ASR} = s_{ASR} + lp'^* n_{words} + fp'^* n_{fillerwords}$$

$$- md^* n_{MTmonograms} - bd^* n_{MTbigrams}$$

$$- td^* n_{MTtrigrams} - sd^* \delta_{isMTsentence} \quad (2)$$

The rescoring approach applies MT knowledge in two different ways: by computing the TM score for each individual hypothesis and by introducing new word class discounts based on MT n-best lists. It has been shown that the MT mono-gram discounts have the strongest influence on the success of the rescoring approach, followed by the TM score. Other parameters apart from the mono-gram discount md and translation model weight $w_{TM}$ only have inferior roles and can be set to zero. This suggests that the additional word context information in form of MT bi- and tri-grams may not be very useful for improving the ASR. However, the MT component is very useful as a provider for a "bag-of-words" that predicts which words are going to be used by the human translator.

A classical cache language model has a dynamic memory component that remembers the recent word history of m words to adjust the language model probabilities based on the history. The cache LM used in various embodiments of the present invention has a dynamically updated "cache," whereas the LM probabilities are influenced by the content of the cache. However, the cache is not used to remember the recent word history but to hold the words (mono-grams)

found in the respective MT n-best list of the sentence that is being decoded at the moment. The cache LM is realized by defining the members of the word class mono-gram in the same manner as for the rescoring approach, but now dynamically, during decoding. Within the basic ASR improvement techniques, the cache LM approach may yield the best improvements results, closely followed by the rescoring approach. This result helps validate the usefulness of the "bag-of-words" knowledge provided by the MT. As this "bag-of-words" knowledge is already applied during decoding, new correct hypotheses are found due to positive pruning effects. This explains why the cache LM approach is able to slightly outperform the rescoring approach, although it lacks the additional form of MT knowledge used by the rescoring approach, namely the direct computation of the TM score.

For language model interpolation, the original LM of the ASR system is interpolated with a small back-off tri-grain language model computed on the translations found within all MT n-best lists. LM interpolation yields only small improvements compared to the cache LM and the rescoring approach. This can be explained by the little value of MT word context information for ASR improvement described hereinabove.

Similar to the improvement of the ASR, the MT improvement technique within the iterative system described in connection with various embodiments herein is a combination of two basic MT improvement techniques, namely language model interpolation and MT system retraining. For language model interpolation, the original MT language model is interpolated with a small back-off tri-gram language model computed on the hypotheses found within all ASR n-best lists. MT system retraining is done by adding the ASR n-best lists several times to the original training data and computing new IBM1 lexica (forward and backward lexicon), whereas the translation memory component of the MT system is held fixed to the original training data. The reason for keeping the translation memory fixed is that an updated memory leads to a loss of complementary MT knowledge that is valuable for further ASR improvement. An updated memory sees to it that the ASR n-best hypotheses added to the original training data are chosen as translation hypotheses by the MT system, meaning that only a slightly changed ASR output of the preceding iteration is used for ASR improvement in the next iteration instead of new MT hypotheses.

The LM interpolation contributes the most to the MT improvement if the translation memory is kept fixed. This means that, while the word context information provided by the MT is of only minimal use for improving the ASR, word context information provided by the ASR is very valuable to improving the MT.

Different combinations of the basic ASR and MT improvement techniques described hereinabove were taken into consideration for an embodiment of a document driven system 26 as shown in FIG. 3. The best results in regard to improving the English ASR system 28 may be observed when using the combination of LM interpolation and retraining with a fixed translation memory as MT improvement technique. The combination of rescoring and cache LM in iteration 0 and the combination of rescoring, cache LM and interpolated LM in iteration 1 may yield the best results as ASR improvement techniques. The better performance resulting from the additional use of LM interpolation after iteration 0 is due to the improved MT context information. The success of the subsequent rescoring of the ASR output is due to the additional form of MT knowledge applied by the rescoring approach; in contrast to the cache LM approach, rescoring does not only consider the MT "bag-of-words" knowledge but also considers the TM score. It could be observed that the most important parameter for rescoring on cache LM system output is the translation model weight $w_{TM}$, because after setting all other parameter to zero, still similar good results could be achieved. No significant improvements were observed for iterations >1. This was true for all examined system combinations that applied a subsequent rescoring on the ASR system output. If no rescoring was used, similar results to the case where rescoring was used could be obtained, but only after several (>3) iterations.

Figure 4:
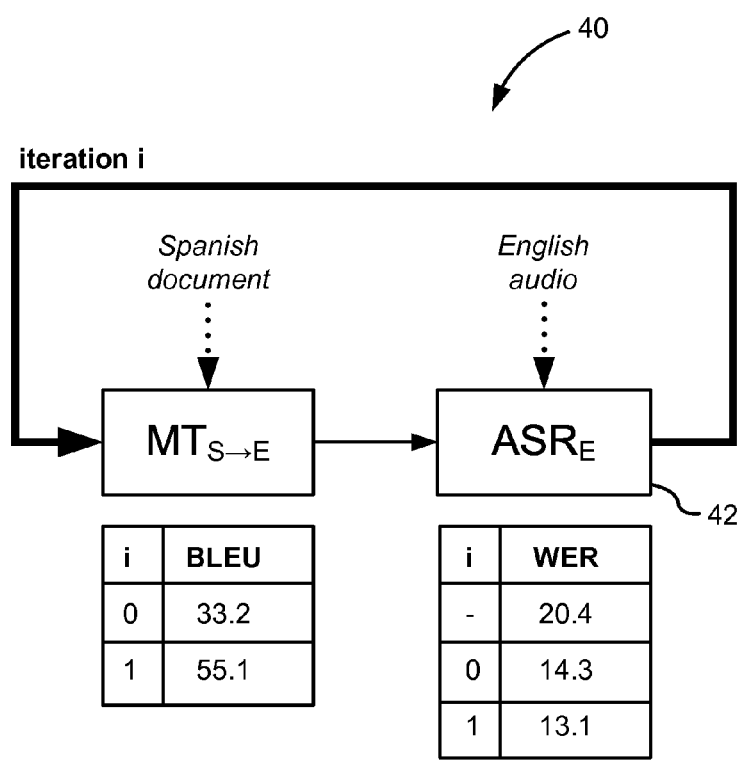
FIG. 4 illustrates an overview of the components of a document driven iterative system along with respective performance values according to one embodiment of the present invention.

FIG. 4 gives an overview on the components of a document driven iterative system 40 along with the respective performance values. With the iterative approach the WER of the English baseline ASR system 42 may be reduced from 20.4% to 13.1%. This is equivalent to a relative reduction of 35.8%.

Figure 5:
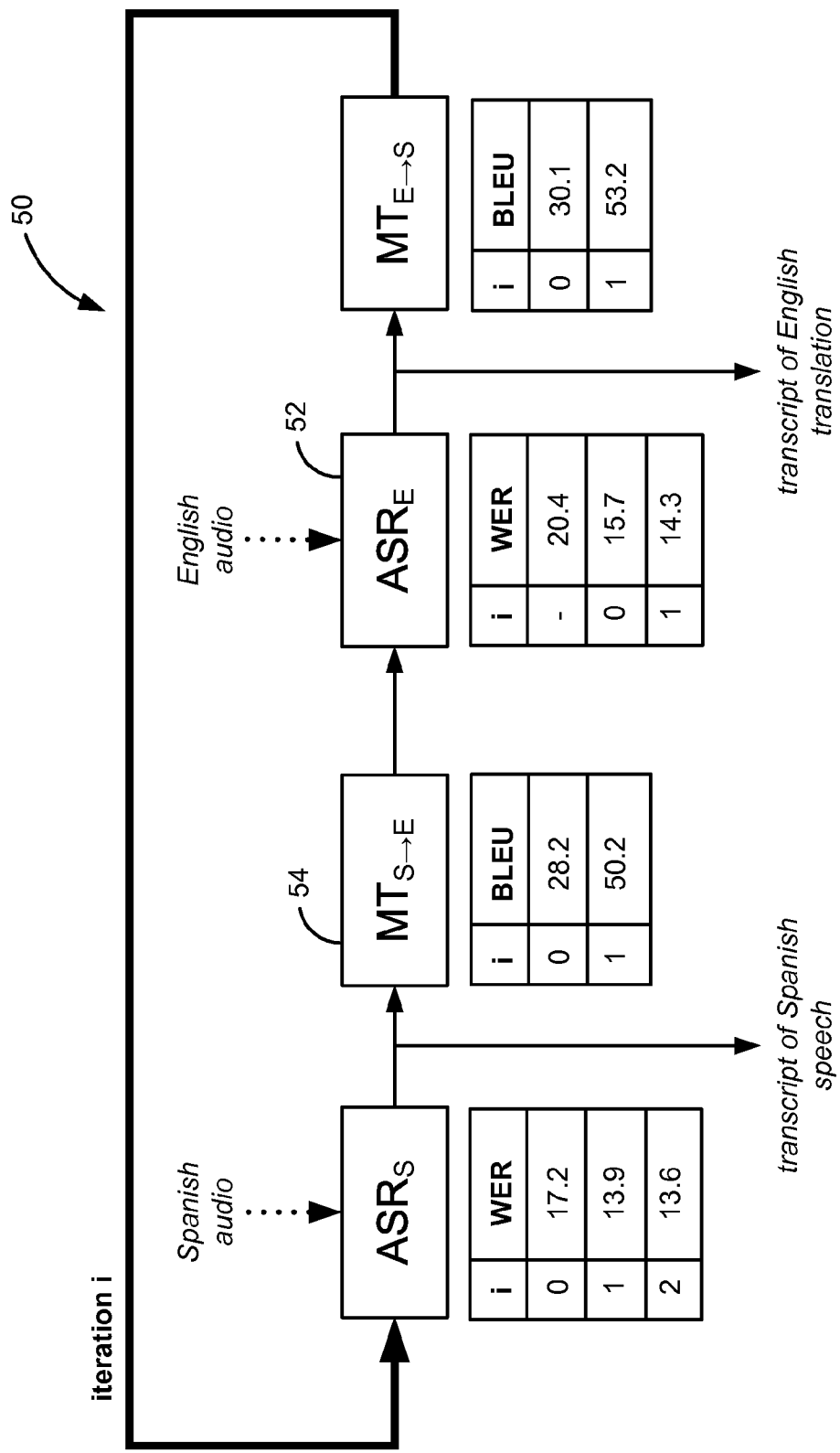
FIG. 5 illustrates an overview of the components of a speech driven iterative system along with respective performance values according to one embodiment of the present invention.

Different combinations of the basic ASR and MT improvement techniques were taken into consideration for various embodiments of the speech driven system described herein. As in the document driven case, the MT components were improved just once within the iterative system design for gaining best results in speech recognition accuracy (for both involved ASR systems). This means that in order to avoid overfitting, the iterative process should be aborted right before an involved MT component would be improved a second time. FIG. 5 gives an overview of the components of a speech driven iterative system 50 along with the respective performance values according to one embodiment of the present invention. The WER of the English baseline ASR system 52 was reduced from 20.4% to 14.3%. This is a relative reduction of 29.9%.

Figure 6:
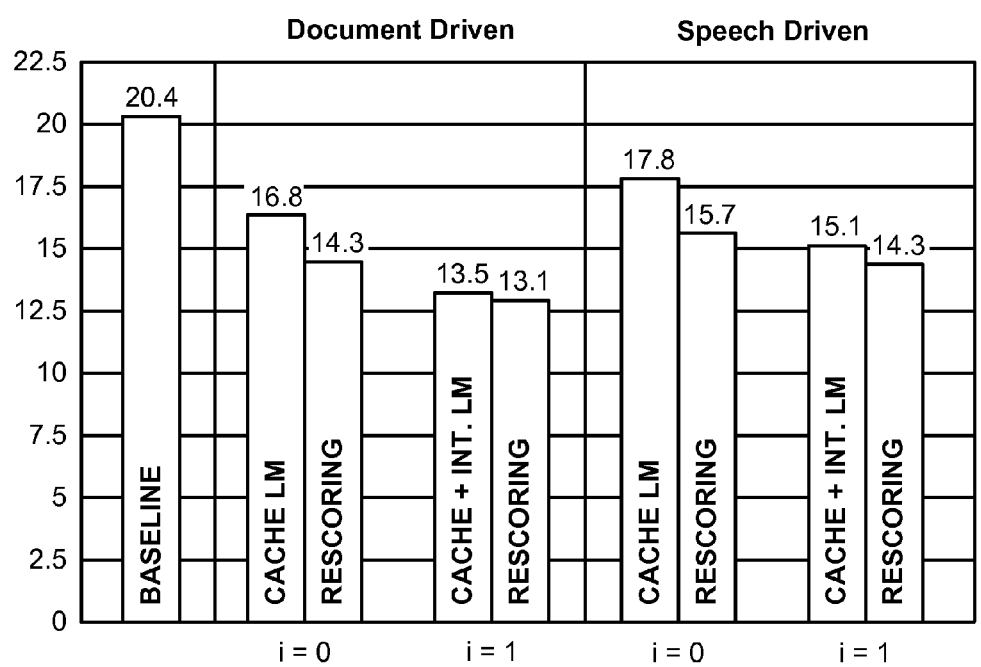
FIG. 6 illustrates a detailed comparison of the performance of an English ASR system in the document driven case and the speech driven case.

In iteration 0, the BLEU score of the Spanish-to-English MT system 54 is 15.1% relative worse than in the document driven case. This is due to the fact that the Spanish source sentences used for translation now contain speech recognition errors. In this context it should be noted that this loss in MT performance is of approximately the same magnitude as the WER of the Spanish input used for translation, i.e. it is of approximately the same magnitude as the WER of the Spanish baseline system. The loss in MT performance leads to a smaller improvement of the English ASR system 52 compared to the document driven case. However, the loss in MT performance does not lead to a loss in English speech recognition accuracy of the same magnitude; compared to the document driven case the WER of the English ASR system 52 is only 9.8% relative higher. FIG. 6 shows a detailed comparison of the performance of the English ASR system in the document driven case and the speech driven case. Even though the gain in recognition accuracy is already remarkably high in both cases without applying any iteration, a still significant gain in performance was observed in the first iteration.

Figure 7:
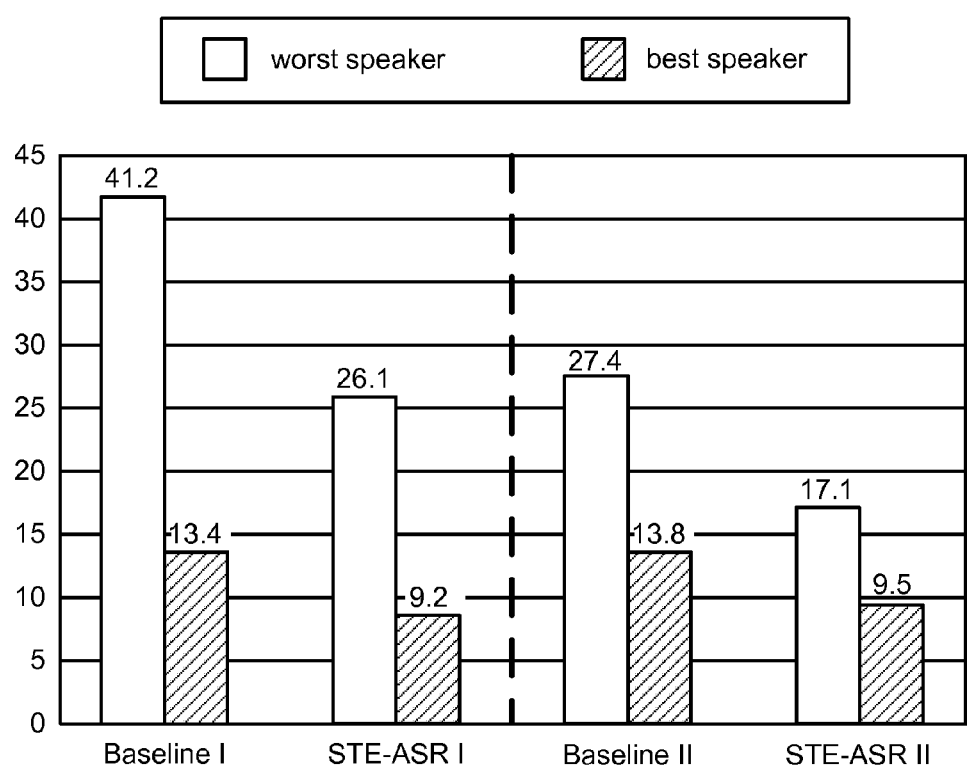
FIG. 7 illustrates the best and worst performing speakers within the two English ASR subsystems before applying MT knowledge and after applying MT knowledge with the help of an iterative scheme.

As mentioned hereinabove, two different STE-ASR systems may be used, one for each of the two data subsets. FIG. 7 shows the best and worst performing speakers within the two English ASR subsystems before applying MT knowledge and after applying MT knowledge with the help of the iterative scheme described herein. While the WER of the worst speaker is reduced by 36.7% relative, the WER of the best speaker is only reduced by 31.3% relative. This means that for speakers with higher word error rates a higher gain in recognition accuracy is accomplished by applying MT knowledge.

The ASR driven system described herein automatically provides an improvement of the involved source language ASR. In one implementation, the WER of the Spanish baseline ASR of 17.2% is reduced by 20.9% relative. This smaller improvement in recognition accuracy compared to the improvement of the English ASR may be explained by the fact that Spanish is a morphologically more complicated language than English.

It is directly possible to incorporate not just one, but several target language audio streams into the iterative system of embodiments of the present invention. For this, the applied improvement techniques only need to be adapted minimally. The adaption of the cache LM approach as well as the LM interpolation (for ASR and MT improvement) and MT retraining is done by including all MT/ASR n-best lists of the preceding MT/ASR systems in the iterative cycle. For rescoring, Equation (1) is extended to allow for several TM scores provided by several MT systems with different target languages, i.e. instead of one TM score and associated TM weight there are now up to n TM scores with their respective TM weights. In the following example, it is shown how an already speech translation enhanced English ASR system is further improved by adding knowledge provided by one additional audio stream in a different target language.

For the implementation a BTEC held-out data set consisting of 506 parallel Spanish, English and Mandarin Chinese sentences was used. Ten percent of the data was randomly selected for system parameter tuning. The English and Spanish sentences were read twice, the Chinese Sentences were read just once. The same Spanish and English baseline ASR systems were used as before. For Chinese speech recognition the ISL RT04 Mandarin Broadcast News evaluation system was used. The vocabulary of the Chinese ASR system has 17K words. The Chinese LM was computed on the Chinese BTEC. FIG. 8 gives an overview of the performance of the baseline ASR systems.

In one implementation, the Spanish and English audio streams for speech translation based ASR improvement were used. The same iterative STE-ASR technique was applied as that described hereinabove except no LM interpolation was used for improving the English ASR system, as a slightly worse WER was observed for doing so. The negative influence of LM interpolation on the performance of the English ASR system can be explained by the already very good match of the English baseline LM with the used data set (the perplexity is only 21.9). The WER of the Spanish ASR system was reduced from 15.1% to 13.4%. The WER of the English ASR system was reduced from 13.5% to 10.6%. Next, it was determined if the performance of the improved English ASR system could be further increased by taking advantage of the additional Chinese audio streams. For this, the Chinese baseline system was improved with the help of the latest computed English system output and then the output of the improved Chinese system was used to once again improve the English system. The MT systems for translating between English and Chinese were trained on the Chinese-English BTEC. The accomplished BLEU scores were with 21.2 for E→C and with 24.1 for C→E very moderate. Nevertheless, the WER of the Chinese system was reduced from 20.0% to 17.1% and for the English system from 10.6% to 10.3%.

Figure 9:
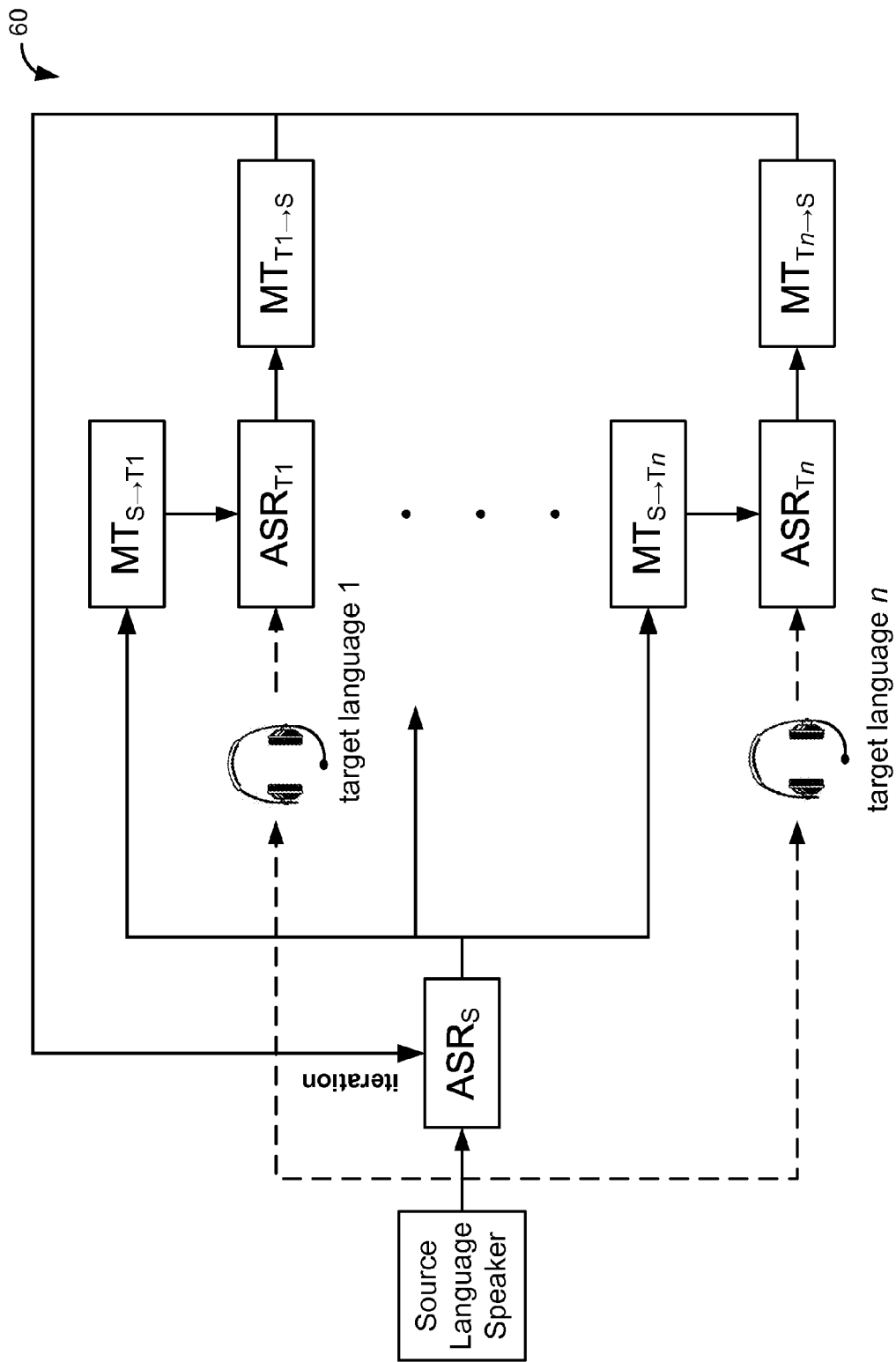
FIG. 9 illustrates an embodiment of a system in which multiple audio streams of human simultaneous translators are used.

FIG. 9 illustrates an embodiment of a system 60 in which multiple audio streams of human simultaneous translators are used. In FIG. 9, there are n target languages.

In various embodiments of the present invention, a translation system is implemented in which there is no corpus of translated material in the target language. In such a case, a language universal acoustic recognizer that is adaptive and language independent may be used for speech recognition. An example of such a recognizer is described in T. Schultz, A. Waibel, "Language Independent and Language Adaptive Acoustic Modeling for Speech Recognition", Speech Communication, Vol. 35, February 2001, which is incorporated herein by reference. In such a system, a source language ASR may be used for the source language in conjunction with the universal language independent recognizer. Both the source language ASR and the universal recognizer may be adaptive and may be trained with each iteration of the system. Also, in various embodiments, when there is no corpus of material in the target language, text extracts in the target language may be used to train a universal recognizer for the target language. As in other embodiments, the universal recognizer may be adaptive and trainable, but its initial accuracy may be better with such extracts than without. An example of an extract is a web page in the target language that has been translated into the source language. The embodiments described herein that use a universal recognizer may be applicable in situations when the target language is a language that is rare and, thus, there is a lack of translated material in that language.

It can be understood that although many embodiments and implementations of the present invention have been described as being applicable to certain languages (i.e., English, Spanish and Chinese), the systems and methods described herein are applicable to any language. Also, embodiments of the present invention may have particular applicability to languages that do not have large corpi of written material.

Various embodiments of the present invention may be implemented on computer-readable media. The terms "computer-readable medium" and "computer-readable media" in the plural as used herein may include, for example, magnetic and optical memory devices such as diskettes, compact discs of both read-only and writeable varieties, optical disk drives, hard disk drives, etc. A computer-readable medium may also include memory storage that can be physical, virtual, permanent, temporary, semi-permanent and/or semi-temporary. A computer-readable medium may further include one or more data signals transmitted on one or more carrier waves.

While the foregoing has been set forth in considerable detail, it is to be understood that the drawings and detailed embodiments are presented for elucidation and not limitation. Design variations may be made but are within the principles of the invention. Those skilled in the art will realize that such changes or modifications of the invention or combinations of elements, variations, equivalents, or improvements therein are still within the scope of the invention as defined in the appended claims.

What is claimed is:

1. A system, comprising:
a first automatic speech recognition component adapted to recognize a spoken language in a source language from a first audible source and to create a source language hypothesis of the spoken language from the first audible source using a first language model;
a second automatic speech recognition component adapted to receive language in a target language spoken by a human translator, the received language being a translation of the spoken language from the first audible source by the human translator, to recognize the received language in the target language spoken by the human translator translating simultaneous with the spoken language from the first audible source, and to create a target language hypothesis of the language spoken by the human translator using a second language model, wherein the second automatic speech recognition component is a universal speech recognition component adapted to recognize a plurality of spoken languages from the human translator translating simultaneous with the spoken language from the first audible source;

a first machine translation component adapted to translate, using a first machine translation model, the source language hypothesis into a target language result;

a second machine translation component adapted to translate, using a second machine translation model, the target language hypothesis into a source language result;

a first training component adapted to train the first language model using the source language result;

a second training component adapted to train the universal speech recognition component using the translation from the source language hypothesis to the target language result;

a third training component adapted to train the first machine translation model and the second machine translation model using the source language hypothesis and the target language hypothesis; and wherein the training components perform an iterative translation cycle.

2. The system of claim 1, wherein at least one of the first automatic speech recognition component and the second automatic speech recognition component utilize an applied rescoring technique.

3. The system of claim 1, wherein at least one of the first automatic speech recognition component and the second automatic speech recognition include a dynamically updated cache memory.

4. The system of claim 1, wherein at least one of the first automatic speech recognition component and the second automatic speech recognition component utilize a language model interpolation technique.

5. The system of claim 1, wherein at least one of the first machine translation component and the second machine translation component utilize a language model interpolation technique.

6. The system of claim 1, wherein the system is adapted to be corrected by a spoken correction during use of the system.

7. The system of claim 1, further comprising:

a third automatic speech recognition component adapted to receive language in a second target language spoken by a second human translator, the received second target language being a second translation of the spoken language from the first audible source by the second human translator, to recognize the received language in the second target language spoken by the second human translator that is translating simultaneous with the spoken language from the first audible source, and to create a second target language hypothesis of the language spoken by the second human translator using a third language model; and a third machine translation component adapted to translate, using a third machine translation model, the second target language hypothesis into a second source language result.

8. The system of claim 1, wherein:

the first automatic speech recognition component is further configured for adapting the source language hypothesis using the trained first language model; and the second automatic speech recognition component is further configured for adapting the target language hypothesis using a trained second language model.

9. A method comprising:

recognizing a spoken language in a source language from a first audible source;

receiving language in a target language spoken by a human translator, the received language being a translation of the spoken language from the first audible source by the human translator;

recognizing, by a universal speech recognition component adapted to recognize a plurality of spoken languages from the human translator, the received language in the target language spoken by the human translator translating simultaneous with the spoken language from the first audible source;

creating a source language hypothesis of the spoken language from the first audible source using a first language model;

creating a target language hypothesis of the language spoken by the human translator using a second language model;

performing an iterative translation cycle, the cycle comprising:

translating, using a first machine translation model, the source language hypothesis into a target language result;

translating, using a second machine translation model, the target language hypothesis into a source language result;

training, by a processor, the first language model using the source language result;

training the universal speech recognition component using the translation from the source language hypothesis to the target language result; and training the first machine translation model and the second machine translation model using the source language hypothesis and the target language hypothesis.

10. The method of claim 9, further comprising:

adapting the source language hypothesis using the trained first language model; and adapting the target language hypothesis using a trained second language model.

11. The method of claim 9, wherein the training of the first language model and the training of the universal speech recognition component comprises use of a language model interpolation technique.

12. The method of claim 9, further comprising:

receiving, from the human translator, a spoken correction of the source language result.

13. A system comprising:

first recognition means for:

recognizing a spoken language in a source language from a first audible source; and creating a source language hypothesis of the spoken language from the first audible source using a first language model;

second recognition means for:

receiving language in a target language spoken by a human translator, the received language being a translation of the spoken language from the first audible source by the human translator;

recognizing the received language in the target language spoken by the human translator translating simultaneous with the spoken language from the first audible source, wherein the second recognition means is a universal speech recognition component adapted to recognize a plurality of spoken languages from the human translator; and creating a target language hypothesis of the language spoken by the human translator using a second language model;

first translation means for translating the source language hypothesis into a target language result;

second translation means for translating the target language hypothesis into a source language result;
means for training the first language model using the source language result;
means for training the universal speech recognition component using the translation from the source language hypothesis to the target language result;
means for training the first translation means and the second translation means using the source language hypothesis
the target language hypothesis from; and
wherein the means for training the language models and translation means collectively perform an iterative translation cycle.

14. The system of claim 13, wherein:
the first recognition means is further configured for adapting the source language hypothesis using the trained first language model; and
the second recognition means is further configured for adapting the target language hypothesis using the trained universal speech recognition component technique.

15. The system of claim 13, wherein at least one of the first automatic speech recognition component, the second automatic speech recognition component, first machine translation component, and the second machine translation component utilize a language model interpolation technique.

16. The system of claim 13, wherein the system is adapted to be corrected by a spoken correction during use of the system.

17. A non-transitory computer readable medium having stored thereon instructions which, when executed by a processor, cause the processor to:
recognize, a spoken language in a source language from a first audible source;
receive, at a universal speech recognition component adapted to recognize a plurality of spoken languages from the human translator, language in a target language spoken by a human translator, the received language being a translation of the spoken language from the first audible source by the human translator;
recognize the received language in the target language spoken by the human translator translating simultaneous with the spoken language from the first audible source;
create a source language hypothesis of the spoken language from the first audible source using a first language model;
create, a target language hypothesis of the language spoken by the human translator using a second language model;
perform an iterative translation cycle, the cycle causing the processor to: translate, using a first machine translation model, the source language hypothesis into a target language result;
translate, using a second machine translation model, the target language hypothesis into a source language result;
train the first language model using the source language result;
train the universal speech recognition component using the translation from the source language hypothesis to the target language result; and
train the first machine translation model and the second machine translation model using the source language hypothesis and the target language hypothesis.

18. The non-transitory computer readable medium of claim 17, further comprising instructions which, when executed by a processor, cause the processor to:
adapt the source language hypothesis using the trained first language model; and
adapt the target language hypothesis using the trained universal speech recognition component.

* * * * *